US005882593A

United States Patent [19]

Fyson

[11] Patent Number: 5,882,593

[45] Date of Patent: Mar. 16, 1999

[54] CHEMICAL WASTE TREATMENT APPARATUS

[75] Inventor: John Richard Fyson, Hackney, England

[73] Assignee: Eastman Kodak Company, Rochester, N.Y.

[21] Appl. No.: 758,706

[22] Filed: Dec. 3, 1996

[30] Foreign Application Priority Data

Dec. 5, 1995 [GB] United Kingdom .................. 9524824

[51] Int. Cl.[6] ............................ B01J 19/00; G03D 3/00; B65B 1/04

[52] U.S. Cl. ............................ 422/40; 396/626; 141/23; 141/381

[58] Field of Search ............................ 396/626, 630; 210/702, 767, 205, 198.1; 422/28, 300; 7/40, 184, 292, 294, 256, 258, 259, 900; 588/236, 249, 261; 222/190, 129; 141/22, 23, 381, 380, 379; 604/317, 403, 416, 409

[56] References Cited

U.S. PATENT DOCUMENTS

| | | | |
|---|---|---|---|
| 4,785,931 | 11/1988 | Weir et al. | 206/222 |
| 5,255,812 | 10/1993 | Hsu et al. | 220/277 |
| 5,431,276 | 7/1995 | Lialin | 206/222 |
| 5,589,145 | 12/1996 | Kaufman | 422/292 |

FOREIGN PATENT DOCUMENTS

| | | |
|---|---|---|
| 0 356 758 | 3/1990 | European Pat. Off. . |
| 0 552 105 | 7/1993 | European Pat. Off. . |
| 04104887 A | 4/1992 | Japan . |

OTHER PUBLICATIONS

JAPIO abstract of JP04104887 A (Kurokawa Toshio), Apr. 7, 1992.

WPIDS abstract of JP04104887 A (Kurokawa Toshio), Apr. 7, 1992.

*Primary Examiner*—Robert Warden
*Assistant Examiner*—Alex Noguerola
*Attorney, Agent, or Firm*—Frank Pincelli

[57] ABSTRACT

The present invention is for a method for treating photographic waste comprising dispensing at least one photographic waste treatment agent from a holder containing at least one treatment agent receptacle and selectively operable releasing means for releasing at least one photographic waste treatment agent from the treatment agent receptacle into a photographic waste receptacle for treating photographic waste received therein; wherein the holder is capable of being arranged in association with the waste receptacle such that on operation of the releasing means, photographic waste treatment agent is released into the waste receptacle.

14 Claims, 1 Drawing Sheet

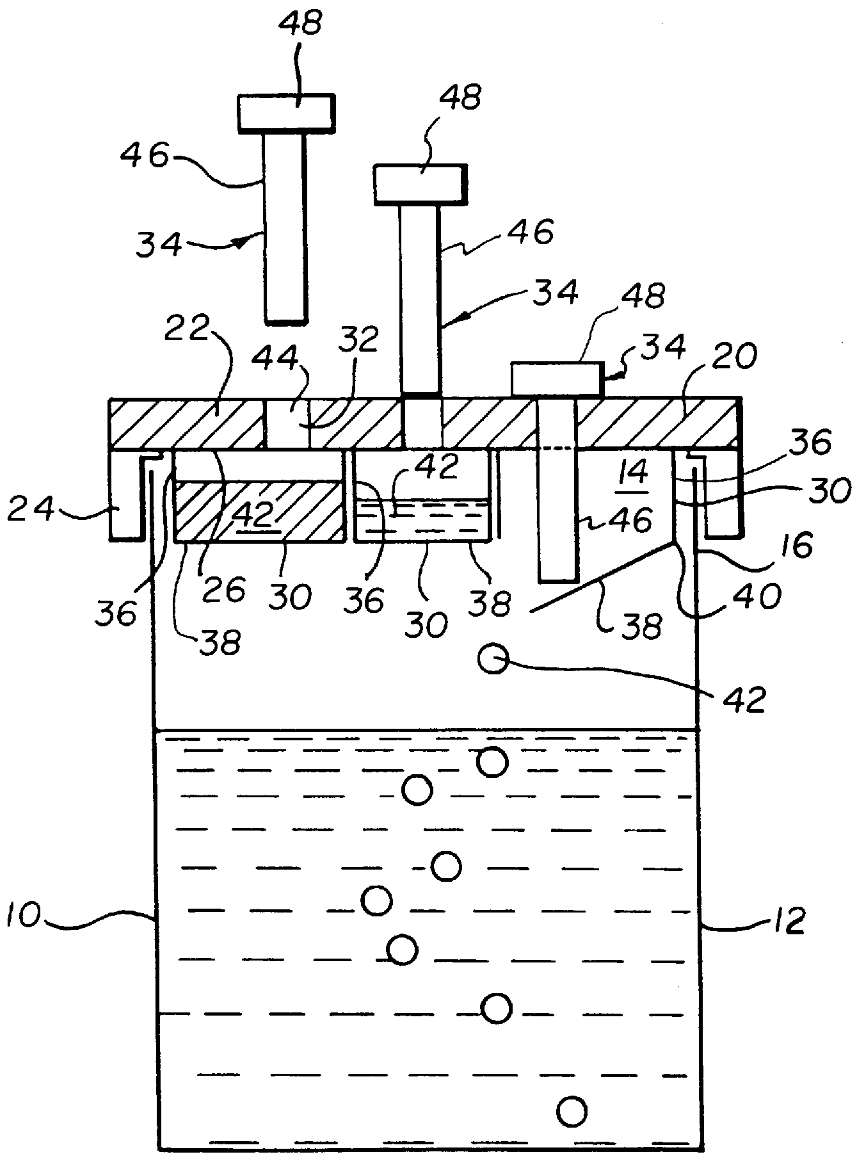
48
48
46
46
34
34
48
34
22
44
32
20
36
42
14
24
42
30
46
16
26
30
36
38
40
36
30
38
38
42
10
12

CHEMICAL WASTE TREATMENT APPARATUS

FIELD OF THE INVENTION

The present invention relates to a chemical waste treatment apparatus and has particular reference to the treatment of used photographic processing materials prior to the disposal of such materials. In particular the invention relates to a holder containing one or more treatment agents which may be supported by or otherwise associated with a conventional photographic processing hand tank or tray to form a chemical waste treatment apparatus. Although the present invention is described herein with particular reference to the treatment of photographic materials, the apparatus of the present invention can be used for treating other kinds of chemical waste materials which it is desirable not to empty directly into a public utilities sewage system.

PROBLEM TO BE SOLVED BY THE INVENTION

While commercial photographic film processing operations are generally well equipped to deal with the waste photographic materials produced by photographic processing, many individual photographers who carry out their own processing are not so equipped. Waste photographic processing solutions typically have an undesirably high chemical oxygen demand and levels of pollutants such as iron, silver and organic chelating agents and developers which make it undesirable, and in some jurisdictions illegal, to dispose of such solutions directly into a public utility sewage system. Hitherto therefore individual photographers have had to make special arrangements which are typically inconvenient and expensive for disposing of such materials.

The present invention seeks to solve this problem by providing an apparatus for the treatment of waste chemicals.

SUMMARY OF THE INVENTION

According to one aspect of the present invention therefore there is provided a holder containing at least one treatment agent receptacle and selectively operable releasing means for releasing at least one treatment agent in a treatment agent receptacle into a chemical waste receptacle for treating chemical waste received therein; wherein the holder is capable of being arranged in association with the waste receptacle such that on operation of the releasing means, treatment agent is released into the waste receptacle. In a preferred aspect the holder is supported by the waste receptacle which may be any conventional processing hand tank or tray, preferably of not more than 50 liters capacity, most preferably not more than 5 liters. Conveniently a Patterson™ tank of volume 2 liters may be used.

Typically, the holder apparatus in accordance with the invention comprises a plurality of treatment agent receptacles which can be filled with the same or different treatment agent. Each treatment agent receptacle may have its own dedicated releasing means which will typically be operable independently of releasing means for the other treatment receptacles.

Alternatively the releasing means may be arranged such that operation of any one releasing means is dependent on operation of any other releasing means, such as, for example, by interlocking of the releasing means in order that the treatment agent may be released in the correct sequence Thus a photographer who carries out his/her own photographic processing can use the holder apparatus of the invention by collecting waste photographic processing solutions in the waste receptacle, supporting the holder thereupon and thereafter operating the releasing means to release one or more treatment agents from the treatment receptacle (s) into the waste material to be treated. Once the reaction(s) between the treatment agent and the photographic processing waste materials are complete, the mixture can be disposed of safely into a domestic sewage system.

In some embodiments, the treatment agent(s) may be incorporated in the treatment receptacle(s) during manufacture and supplied with the treatment agent(s) in situ. The user can therefore operate the apparatus without having to contact any treatment agent. The holder apparatus may be a disposable "one-use" apparatus. Alternatively, the treatment agent receptacle may be refillable. In a particular aspect of the invention it is envisaged that after use the holder apparatus will be returned to the manufacturer for refilling a treatment agent receptacle with fresh treatment agent.

The releasing means may comprise a plunger for fitting in a passageway extending through a retaining member of the treatment receptacle. In some embodiments of the invention however the retaining member of the treatment receptacle may include a flap member, preferably at the base of the receptacle, and releasable securing means for securing the flap member in a closed position to prevent escape of the treatment agent; the releasing means may be adapted for releasing the securing means and opening the flap member to release the treatment agent into the waste receptacle.

Typically the releasing means will comprise a manually operable plunger arranged for pushing against the flap member for opening the latter against the releasable securing means. The releasable securing means may comprise, for example, adhesive applied conveniently from a glue gun, overlapping the periphery of the flap member and a juxtaposed portion of the retaining member of the treatment receptacle. The adhesive may also provide a sealing function against leakage of the treatment agent between the retaining member and the flap member. It will be appreciated that the adhesive will be such as to provide a frangible seal between the flap member and the retaining member which can be broken on urging the plunger against the flap member.

Typically the treatment receptacle will include a closure means. Said plunger may extend through the closure means and, in some embodiments, sealing means may be provided between the plunger and the closure means such that the holder in association with the waste receptacle can be rocked to agitate the contents without spillage.

In a particular aspect of the invention the holder of the present invention may comprise a closure for the waste receptacle, having releasable securing means for securing the closure on a flange defining an opening of the receptacle so that spillage can be eliminated.

In a different aspect of the invention there is provided a chemical waste apparatus comprising the holder as hereinbefore described in association with a chemical waste receptacle.

BRIEF DESCRIPTION OF THE DRAWINGS

The accompanying drawing illustrates in cross-section a holder made in accordance with the present invention and chemical receptacle designed to be used therewith.

DETAILED DESCRIPTION OF THE INVENTION

A chemical waste treatment tank (10) comprises a waste chemical receptacle (12) having an opening (14) defined by an upstanding flange (16) and a holder (20) which is configured to mate with the chemical receptacle (12). The holder (20) comprises a crown (22) and a depending skirt (24) which, in the fitted position, overlays the outer surface of the upstanding flange (16). A seal of a known kind (not shown) is provided between the holder (20) and the receptacle (12) to form a fluid tight seal therebetween in the fitted position.

The underside (26) of the crown (22) carries a plurality, in this case three, of treatment agent receptacles (30). Juxtaposed each treatment agent receptacle (30), the crown (22) is formed with a passageway (32) which is configured to accommodate a plunger (34). Each treatment agent receptacle (30) comprises a side wall (36) and a bottom flap (38) which is joined to the side wall (36) at point (40).

Initially, the flap (38) of each treatment agent receptacle (30) is disposed in a closed position as shown in the two left-hand treatment receptacles (30) of the FIGURE for holding a treatment agent (42), which can be solid or liquid, in the receptacle (30). The flap (38) is secured releasably in the closed position by a frangible strip of adhesive or glue (not shown) overlaying the periphery of the flap (38) and the juxtaposed portions of the side wall (36).

Each treatment agent receptacle can contain the same or a different treatment agent from the others Furthermore, each of the passageways (32) is initially closed by a fluid-tight frangible or removable seal (44), and the plungers (34) may be supplied separately.

The treatment agent (42) in a given treatment agent receptacle (30) can be released into the waste chemical receptacle (12) by inserting a plunger (34) through the passageway (32), breaking or removing the film seal (44) and urging the plunger (34) downwardly against the flap (38) to break the frangible strip of adhesive or glue and open the flap (38) as shown in the right-hand receptacle (30) of the FIGURE. By opening the flap (38), the treatment agent (42) in the treatment agent receptacle (30) is released into the waste chemical receptacle (12).

Each plunger (34) comprises an elongate stem (46) of circular cross section and an enlarged head portion (48) which, in the fully inserted position, abuts against the upper surface of the crown (22). In some embodiments, the stem (46) of the plunger (34) may flare radially outwardly towards the head portion (48), such that in the fully inserted position, the plunger (34) forms a tight-fit in its corresponding passageway (32) to form a seal with the crown (22). Thus, the tank (10) can be rocked or shaken slightly to agitate the contents of the waste chemical receptacle (12) without risk of spillage through the passageway (32).

The treatment agents (42) in the treatment agent receptacle (30) can be released into the waste receptacle (10) at the same time or at timed intervals In use, a user will empty spent photographic processing materials into the waste chemical receptacle (12) and, when required, place the holder (20) on the upstanding flange (16) and release one or more treatment agents (42) into the spent photographic materials according to a prescribed schedule. The mixture of treatment agents and spent chemicals can then be thrown safely away down a domestic sewage.

It is envisaged that the holder (20) may be supplied ready filled with one or more treatment agents (42) as a disposable one-use product or as a refillable unit, thus avoiding the need for the user to contact the treatment agent chemical. The waste chemical receptacle (12) may be a conventional photographic processing hand tank or tray.

The tank as hereinbefore described was tested using a model photographic effluent made by combining 300 ml of the following developer with 500 ml of a bleach-fix, also described below:

Developer:
- potassium carbonate 20 g
- diethylhydroxylamine 5 g
- EDTA 1 g
- CD3 4 g
- 30% hydrogen peroxide 5 g
- water to 1 liter
- pH adjusted to 10.3 with sulfuric acid or NaOH Bleach-fix:
- sodium iron (III) EDTA 20 g
- sodium thiosulfate 50 g
- sodium sulfite 20 g
- acetic acid 20 ml
- water to 1 liter
- the pH was adjusted to 5.5 with acetic acid.

0.8 g of silver chloride was added to this mixture and this was stirred until it had dissolved. The mixture was left to stand overnight to allow most reactions to complete.

This solution was put in the waste chemical receptacle (12). The holder (20) was provided with three treatment agent receptacles (30); one containing 30 ml of 30% hydrogen peroxide, one with a mixture of 25 g calcium hydroxide and 25 g decolorizing charcoal, and the other with 30 ml of 7% aluminum chloride solution. The holder was put on the receptacle and a waterproof seal made by screwing it down tightly. A plunger (34) was pushed through the peroxide compartment and the whole shaken gently. It was found necessary to pull out the plunger (34) to release some gas pressure after 20 seconds. The shaking was continued intermittently for 2 minutes. Another plunger was then pushed in to release the calcium hydroxide and charcoal. This was shaken with the effluent mixture. Finally after another 2 minutes, the aluminum chloride was released by pushing in the last plunger. The mixture was then shaken for a further 2 minutes. At this point the mixture would be sewered as a whole or allowed to settle and the liquid poured down the drain and the solid put in with ordinary commercial or domestic waste for future disposal.

To test the efficacy of the method, before disposing of the mixture, it was filtered by standard means using fast filter paper and the filtrate was analyzed to look for dissolved pollutants.

The following table gives the concentrations of components before and after treatment.

| COMPONENT | CONCENTRATION BEFORE TREATMENT | CONCENTRATION AFTER TREATMENT |
|---|---|---|
| Iron | 1950 ± 300 ppm | <2 ± 2 ppm |
| EDTA | 9510 ± 500 ppm | <100 ± 100 ppm |
| CD3 | 1250 ± 50 ppm | <10 ± 10 ppm |
| Chemical Oxygen Demand | 10 ± 2 g/liter | <1 ± 1 g/liter |
| Silver | 750 ± 10 ppm | 2 ± 1 ppm |

All the pollutants measured were removed to an extent that they could not reliably be detected by the analytical methods employed.

Parts List

10 chemical waste treatment tank
12 waste chemical receptacle
14 opening
16 flange
20 holder

22 crown
24 depending skirt
26 underside
30 treatment agent receptacles
32 passageway
34 plunger
36 side wall
38 bottom flap
40 point
42 treatment agent
44 seal
46 elongate stem
48 head portion

I claim:

1. A method for treating photographic waste comprising the step of dispensing at least one photographic waste treatment agent from a holder into photographic waste, wherein said holder has at least one treatment agent receptacle containing said at least one photographic waste treatment agent, and selectively operable releasing means for releasing said at least one treatment agent, said selectively operable releasing means including a flap member being secured to said at least one treatment agent receptacle by releasable securing means, said flap member forming at least a portion of the bottom of said at least one receptacle, said flap member being secured in the closed position to prevent escape of said treatment agent from said at least one treatment agent receptacle such that upon breaking of said releasable securing means said flap opening up so as to release the treatment agent contained in said at least one treatment agent receptacle into said photographic waste.

2. The method according to claim 1 wherein said at least one treatment agent receptacle has its own activation means for breaking said releasable securing means which can be operably independent of the activation means for any other receptacle.

3. The method according to claim 1 wherein said photographic treatment agent is provided in said at least one treatment agent receptacle during manufacture of the holder.

4. The method according to claim 1 wherein the selectively operable releasing means comprises a manual, operable plunger arranged for pushing against said flap member for opening of said flap member.

5. The method according to claim 1 wherein said releasable securing means comprises glue.

6. The method according to claim 1 wherein said releasable securing means is a tangible strip of adhesive.

7. The method according to claim 1 wherein said photographic treatment agent is incorporated into the at least one treatment agent receptacle during manufacture of the holder.

8. A photographic waste treatment method comprising the step of dispensing a photographic waste treatment agent from a holder to a waste receptacle, wherein said holder and said waste receptacle are components of a photographic waste treatment apparatus, said holder having at least one treatment agent receptacle containing at least one photographic waste treatment agent, and selectively operable releasing means for releasing said at least one photographic waste treatment agent, said holder being arranged with respect to said waste receptacle such that upon operation of the releasing means said at least one photographic waste treatment agent contained in said at lease one treatment agent receptacle is released into the waste receptacle, said selectively operable releasing means includes a flap member which is secured to said at least one treatment agent receptacle by releasable securing means, said flap member forming at least a portion of the bottom of said at least one receptacle, and said waste receptacle containing said photographic waste.

9. The method according to claim 8 wherein said holder is supported by said waste receptacle.

10. The method according to claim 8 wherein the waste receptacle has a capacity of not more than 50 liters.

11. The method according to claim 8 wherein said waste receptacle has a capacity of not more than 5 liters.

12. The method according to claim 8 wherein a plurality of treatment agent receptacles are provided which can be filled with the same or different photographic treatment agents.

13. The method according to claim 8 wherein each treatment agent receptacle has its own dedicated activation means for breaking of said releasable securing means which can be operable independently of the activation means for any other receptacle.

14. The method according to claim 8 wherein said selectively operable releasing means comprises a plunger which passes through a passageway in said holder and extending into said treatment agent receptacle.

* * * * *